June 18, 1957  H. R. WALCOTT, JR  2,796,565
ELECTRICAL CONTROL SYSTEM
Filed March 27, 1952  2 Sheets-Sheet 1

INVENTOR.
HENRY R. WALCOTT, JR.
BY
C. R. Miranda
ATTORNEY

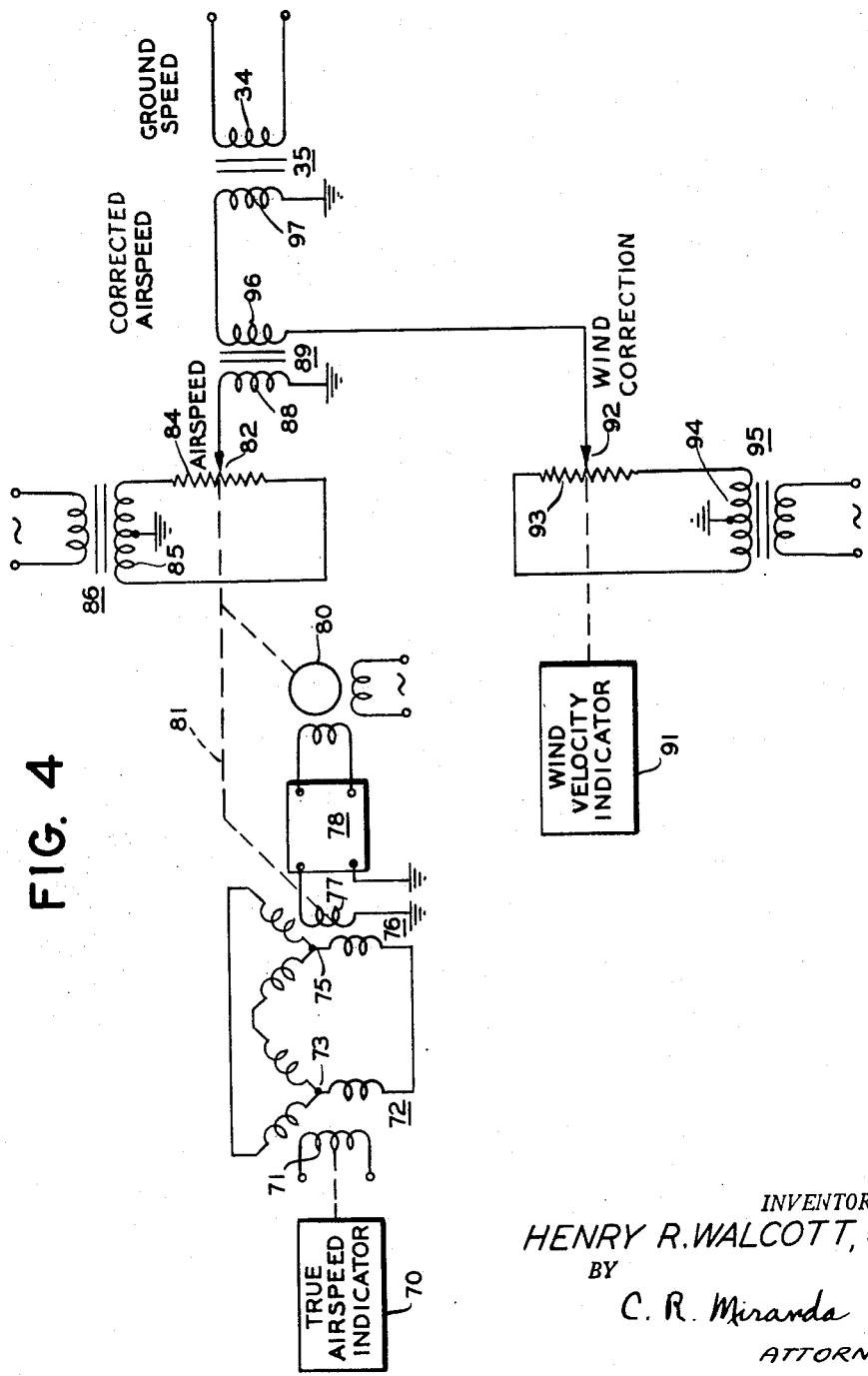

ment which is rotated at a speed which is directly proportional to the relative speeds of the motors and directly proportional to the amplitude of the command signal and directly proportional to the sensed condition. If integration is desired, the output means may include an integrator actuated by said output element and having a total displacement for a given period of time which is directly proportional to the integral of the relative speeds of the motors, and directly proportional to the integral of the change in the condition, for such given period of time. For example, the integral of the ground speed of a craft is the ground distance travelled by the craft with respect to a reference point such as a point of departure or point of destination.

2,796,565

ELECTRICAL CONTROL SYSTEM

Henry R. Walcott, Jr., Allendale, N. J., assignor to Bendix Aviation Corporation, Teterboro, N. J., a corporation of Delaware Application March 27, 1952, Serial No. 278,793

16 Claims. (Cl. 318—8)

This invention in general relates to electrical control systems, and more particularly to such systems which provide for an extremely wide range of accurately controlled speeds of an output member.

Heretofore, arrangements have been proposed for controlling the speed of an output member wherein a speed controlled motor, and a generator directly driven by the motor, were employed to drive the output member. The output shaft was directly coupled to the motor shaft, and the speed of the motor controlled by algebraically adding the generator voltage output to the input signal voltage to the motor. By varying the speed of the motor, speed control of the output member was effected. These arrangements have been found to be unsatisfactory because non-linear operation of the motor resulted when the latter was driven at extremely low speeds. For example, if the desired speed range of the output member was from zero to 3600 R. P. M., the motor could not be controlled linearly below speeds of 50 R. P. M.

Another disadvantage of the above type of control systems is that reversible operation of the output member presented inaccuracies in system operation. It has been determined that when a generator is driven in opposite directions at a preselected speed, the amplitude and phase of the generator voltage output varies, whereby operation of the output member is correct for one direction of motor rotation but incorrect for rotation of the motor in the opposite direction.

The present invention, therefore, contemplates a system for linearly controlling the speed of an output member from zero to a desired maximum R. P. M. The present system comprises a constant speed channel and a variable speed channel, each including a motor-generator set, the motor in the first mentioned channel being driven at a predetermined constant speed of operation. The output of the generator in the constant speed channel is fed to the motor in the variable channel to maintain the speeds of the two motors substantially equal. A differential mechanism, having an output shaft, is connected for operation by both motors and the shaft is responsive to the differential speed of the two motors. By applying a control voltage which is algebraically added to the constant speed generator voltage going to the motor in the variable speed channel, the latter motor is operated above and below the speed of operation of the constant speed motor to obtain rotation of the output member corresponding to the magnitude of the control voltage.

The present invention in another aspect contemplates the provision in apparatus responsive to a sensed condition, such as for example, the ground speed of a craft, of signal generating means for producing an electrical command signal having a magnitude corresponding to the sensed condition, a pair of continuously running motors normally operating at speeds having a predetermined fixed relationship to each other, means responsive to the command signal to alter the relative speeds of said motors in a sense depending upon the sensed condition, and output means moved as a function of the relative speeds of said motors. The output means may include an ele- An object of the present invention, therefore, is to provide a novel system which effects an extremely wide range of accurately controlled speeds of an output member.

Another object is to provide a novel system wherein a variable speed motor is operable by another motor-driven means which is driven at a predetermined speed of operation and means are provided to maintain the speeds of the two motors equal.

A further object is to provide a novel system wherein a variable speed motor is operated at speeds above and below the speed of a constant speed motor to obtain rotation of an output member equal to the differential speed of the motors.

The above and other objects and advantages of the present invention will appear more fully hereinafter from a consideration of the detailed description which follows taken together with the accompanying drawings wherein one embodiment of the invention is illustrated.

In the drawings wherein like reference characters refer to like parts throughout the several views;

Fig. 2 is an elevational view of one form of a differential driving mechanism utilized in the novel system of Fig. 1;

Fig. 3 is a partial side elevational view of the differential driving mechanism of Fig. 2; and Fig. 4 is a schematic representation of a system with which the present invention may be employed.

Figure 1:
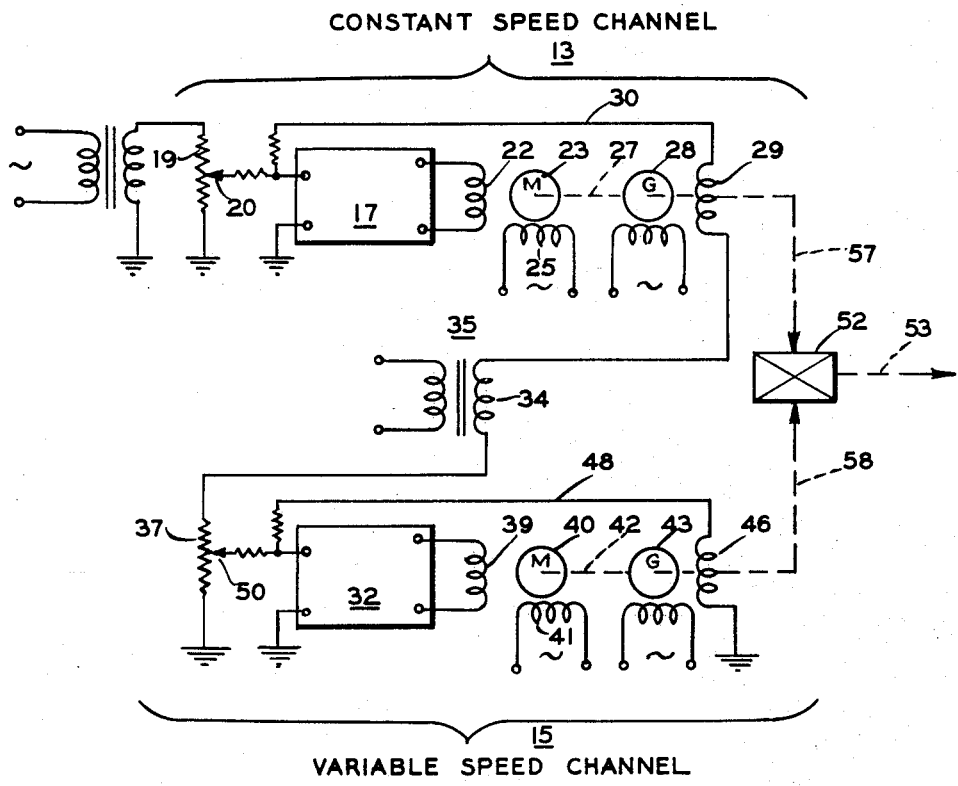
Fig. 1 is a schematic illustration of the electrical control system embodying the present invention.
Figure 1:
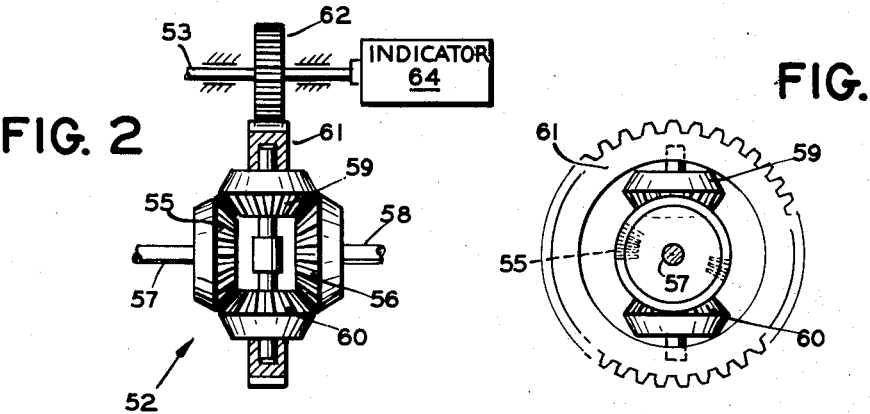

Referring now to the drawings for a more detailed description of the present invention, and more particularly to Fig. 1 wherein one embodiment thereof is clearly illustrated, an electrical control system is shown which comprises a constant speed channel 13 and a variable speed channel 15. Constant speed channel 13 includes a conventional control amplifier 17, shown as a box, which has applied to it a fixed signal voltage from an alternating voltage supply source through a resistance 19. The position of a tap 20 along resistance 19 determines the magnitude of the input signal to amplifier 17 and as will be shown presently, tap 20 is maintained at one set position. Connected to the output of amplifier 17 is a variable phase winding 22 of a two phase motor 23, which includes a fixed phase winding 25 energized from a source of alternating voltage. As is well understood by those skilled in the art, motor 23 is driven at a speed corresponding to the magnitude of the signal output from the amplifier.

Coupled directly to motor 23 by a driving connection 27, shown as a broken line, is the armature of an alternating current generator 28 having a fixed energized winding and an output winding 29 connected by a lead 30 to the input of the amplifier. A voltage corresponding to the speed of operation of motor 23 is developed in winding 29 which is algebraically added to the fixed signal voltage to control the speed of operation of the motor 23. The generator 28 output voltage is in phase opposition to the fixed signal voltage whereby a resultant signal voltage is effected and applied to motor 23 to hold the speed of motor 23 at a constant value determined by the position of tap 20 along resistance 19.

The output voltage from generator 28 is also applied as the control input signal voltage to an amplifier 32 shown as a box, through the secondary winding 34 of a control transformer generally designated by the numeral 35, the function of which will be shown hereinafter, and a resistance 37. Connected to the output of amplifier 32 is the variable phase winding 39 of a two phase motor 40 which includes a fixed phase winding 41 energized from a source of alternating voltage. A generator 43 is driven by motor 40 through a direct driving connection 42 shown in Fig. 1 as a broken line. Generator 43 includes an energizing winding and an output winding 46 which is connected in series with the input of amplifier 32 by way of a lead 48. A voltage corresponding to the speed of operation of motor 40 is developed in winding 46 which is algebraically added to the input signal voltage from 29 to the amplifier 32 to control the speed of operation of the motor 40. The voltage from generator 43 is in phase opposition to the input signal voltage whereby a resultant signal is effected to hold the speed of motor 40 at a constant value as determined by the value of the output signal voltage from generator 28. If the two loops were functionally identical motor 40 would run at the same speed as motor 23. Since the two loops cannot be made identical, resistance 37 and a movable tap 50 are connected across the input of amplifier 32 to compensate for the difference in motor and generator characteristics so that the two motors run at substantially the same speed.

From the foregoing, it may be readily understood that the speeds of motors 23 and 40 are made substantially equal. If external causes, such as temperature or line voltage variations, result in changes in speed of motor 23, a change in output from generator 28 will cause the speed of motor 40 to change by an equivalent amount so that the two motors remain at the same speed even though the speed may not be perfectly constant.

Motors 23 and 40 drive into a differential mechanism 52 (shown schematically in Fig. 1) which has an output member or shaft 53 (Fig. 2) shown in broken lines in Fig. 1. Although the differential mechanism 52 may be of any suitable construction, in the example shown in Fig. 2, bevel gears 55 and 56 are provided coupled respectively to the two shafts 57 and 58 (shown in Fig. 1 as broken lines) of motors 23 and 40, and engaging two other bevel gears 59 and 60 between the two bevel gears 55 and 56. A transmitting gear 61 connected to the bevel gears 59 and 60 engages a driven pinion 62. The shaft 53 is driven by pinion 62 and is connected to drive an indicator 64, which may be a counter of conventional type herein shown schematically as a box. By means of this arrangement, when shafts 57 and 58 are turned in opposite directions, if the speeds of these two shafts are equal, bevel gears 59 and 60 turn only around their own axis and do not revolve around bevel gears 55 and 56. Accordingly, transmitting gear 61 does not revolve and, therefore, does not turn pinion 62 and shaft 53, whereby the latter remains at rest. When there is a difference in the speeds of motors 23 and 40, bevel gears 59 and 60 will revolve around gears 55 and 56 with the result that transmitting gear 61 revolves in response to and drives pinion 62 and shaft 53 at a speed corresponding to the differential speed of the motors.

The present invention contemplates a wide range of accurately controlled speeds of output shaft 53 and thus, if an additional voltage is introduced by way of transformer 35 either in phase or 180° out of phase with the voltage from generator 28 going to amplifier 32, motor 40 will change speed by an amount proportional to the additional voltage without affecting the speed of motor 23. Since the motors do not have to be brought to extremely low speeds, it may be readily seen that linear operation of the output shaft 53 at very low speeds may be obtained because shaft 53 is responsive only to the differential speed of the motors. The foregoing arrangement readily overcomes past difficulties wherein reversibility of operation of a generator presented variations in the amplitude of the output voltage therefrom with a preselected speed of the motor in opposite directions. With the present invention, for example, if it is desired to obtain reverse movement of output shaft 53, the voltage introduced in transformer 35 is made 180° out of phase with the voltage from generator 28, whereby the voltage present at the input of amplifier 32 is decreased to lessen the speed of motor 40 below the constant speed of motor 23. Since the speed of motor 23 at this time is greater than the speed of motor 40, the output of motor 23 as brought into differential mechanism 52 is such as to reverse the direction of movement of output shaft 53. In this manner, generator 43 is always driven in one direction.

The present invention may be readily used as an electro-mechanical integrator. For example, if the signal voltage introduced in transformer 35 is proportional to the speed of an object, the total angular displacement of differential output shaft 53 at any instant after start will be proportional to the integral of the signal voltage at 35 with the time for which it is applied. Thus, indicator 64 may be utilized to indicate distance travelled by the object.

Figure 4 illustrates a system with which the present invention may be employed to indicate ground distance travelled by aircraft, by integrating the air speed of the craft corrected for wind velocity.

The system of Figure 4 comprises a conventional true airspeed indicator 70, shown as a box, which angularly displaces a rotor winding 71 of an inductive transmitter 72 from a null position an amount corresponding to the prevailing indicated airspeed of the craft. Transmitter 72 includes a three phase stator winding 73 which has induced therein a signal voltage corresponding to the angular deviation of winding 71 from null, the latter winding being connected to an alternating current source. Connected back-to-back with stator winding 73 is a stator winding 75 of an inductive receiver 76 which includes a displaceable rotor winding 77. Deviation of rotor winding 71 from null induces a signal in rotor winding 77 which is fed to an amplifier 78, shown as a box, to drive a motor 80 connected to the output thereof, whereby winding 77 is driven into positional agreement with winding 71 by way of a driving connection 81, illustrated as a broken line. The foregoing comprises a follow-up arrangement which is well understood by those skilled in the art and for that reason, no further explanation thereof is believed necessary.

Motor 80 also positions a movable tap 82 along a resistance 84 which is connected across the secondary winding 85 of a supply transformer 86. Winding 85 is connected at its midpoint to ground whereby movement of tap 82 on either side of a zero position (tap 82 being at a zero position in Fig. 4) provides a signal across the primary winding 88 of a transformer 89, the phase and amplitude of the signal is dependent on the direction and extent of movement of tap 82 from the zero position. Thus, the signal which is impressed across primary winding 88, is made proportional to airspeed.

As previously pointed out, the airspeed of the craft is corrected for wind velocity and this is accomplished by a wind velocity indicator 91, shown as a box, and a follow-up arrangement (not shown) identical with the follow-up arrangement of the airspeed indicator. Changes in wind velocity effect the positioning of a movable tap 92 to one side or the other of a zero position as the case may be along a resistance 93 connected across the secondary winding 94 of a transformer 95. Secondary winding 94 is grounded at its midpoint and movement of the tap on either side of the zero position (tap 92 being at a zero position in Fig. 4) provides a signal across the secondary winding 96 of transformer 89, the phase and amplitude of the signal depending on the direction and extent of movement of tap 92 from the zero position. The wind velocity signal is algebraically added to the airspeed signal to effect a signal voltage across the primary winding 97 of transformer 35 corresponding to the ground speed of the craft.

The ground speed signal, thus, is introduced in secondary winding 34 of transformer 35 to control the speed of motor 40 of Figure 1 whereby the signal is integrated to effect rotation of differential output shaft 53 and actuation of indicator 64. In this manner, the ground distance travelled by the craft may be read from indicator 64.

It will now be readily apparent that the present invention provides a novel system which provides for an extremely wide range of accurately controlled speeds of an output member 53. By providing a constant speed motor 23 and a variable speed motor 40 working into a differential mechanism, linear operation of an output shaft 53 may be effected. The provision of a variable speed motor 40 which runs at a speed above or below the speed of a constant speed motor provides for reversibility of motion of an output shaft 53, and linear control, inasmuch as the motors do not have to be run at very low speeds.

As illustrated in Figure 4, an A. C. control voltage signal (or command signal) having an amplitude directly proportional to the ground speed of an aircraft is developed between the upper terminal of transformer secondary 96 and ground by algebraically adding a wind correction A. C. voltage (from across potentiometer 93 and transformer secondary 94 as derived from wind velocity measuring apparatus 91) to an A. C. voltage (across transformer secondary 96) of amplitude directly proportional to true airspeed (as derived from true airspeed measuring apparatus 70). The command signal is applied to the primary winding 97 of a transformer 35 and appears across the secondary winding 34.

It will thus be seen that the apparatus is responsive to the sensed condition and that the command signal has an amplitude or magnitude which is directly proportional to the sensed condition, the condition in the particular embodiment disclosed by way of example being the ground distance of a craft, for example in degrees longitude, which may be measured from a fixed departure point or to a fixed destination point, the direction or sense of such change of ground distance (i. e. ground speed) determining the phase of the command signal at 34.

Turning to Figure 1, it will be seen that the command voltage at 34 is algebraically added to the opposing output voltages from a pair of continuously running generators 28 and 43, driven respectively by a pair of continuously running motors 23 and 40. The speed and output voltage from generator 28 remain constant during operation, and the output voltage from generator 28 is substantially 180° out of phase with the voltage from generator 43. When the craft is in a condition of rest with zero change of ground distance (ground speed) and hence zero command voltage at 34, the opposing voltages from generators 28 and 43 produce a resultant voltage at the input to amplifier 32 sufficient to drive motor 40 at the same speed as motor 23. The two motors have their output shafts coupled to suitable mechanical or electromechanical differential apparatus (52), so that with zero change in the measured condition the output element (shaft 53) is at rest.

When the craft moves in a forward direction so that the change in the condition, and hence also the command voltage at 34, attains a finite value, then the command voltage at 34 supplements the voltage from generator 28 in opposition to the voltage from generator 43, so that a larger resultant voltage is applied to motor 40 to alter its speed relative to the constant speed of motor 23 in a sense (i. e. to increase its speed for forward craft movement) depending upon the sense (forward movement) of the ground speed of the craft, until the increased speed of motor 40 is proportional to the new finite value of the ground speed and system equilibrium is attained. Since the speed of the output shaft 53 is directly proportional to the difference in the speeds of motors 23 and 40 and the speed of motor 23 is constant, the speed of rotation of output shaft 53 is directly proportional to the ground speed of the craft. In those applications where integration is desired, the shaft 53 may turn an integrator device 64 such as a conventional indicator with counter wheels, which in the instant case would yield an indication of the ground distance travelled (e. g. in degrees longitude) by the craft from a departure point or the ground distance remaining to go to a destination point.

It is to be understood that the present invention is not limited to the embodiment illustrated herein but may include a system wherein the controlled rotation of two output members is desired. Thus, by providing a second variable speed channel, in addition to the embodiment shown herein, and having a motor-generator set and a control transformer similar to transformer 35, controlled rotation of a second shaft may be obtained. In that case, the output of the generator in the constant speed channel is fed not only to the variable-speed motor 40 but also to the motor in the second variable speed channel to maintain the speed of the last motor equal to the speed of the motor in the constant speed channel.

Although one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. In a system of the type described, a motor driven at a preselected speed of operation, means responsive to the operation of said motor for developing an output voltage corresponding to the speed of operation of said motor, a second motor connected for operation by said output voltage, means responsive to the operation of said second motor for developing a voltage, and means for algebraically adding said last-mentioned voltage to said first output voltage to control the speed of operation of said second motor so that the speeds of the first and second motors bear a predetermined relationship with respect to each other.

2. A two-channel system comprising a motor-driven generator in each channel, the motor in one of said channels being driven at a preselected speed of operation to produce a preselected first output signal which corresponds to said preselected speed for all speeds in the range of speeds of the motor in the other channel, means connecting the output of the generator in said one channel to drive the motor in the other channel, and means for combining the output signal from the generator in said other channel with said first output signal to control the speed of operation of the motor in said other channel so that the speeds of the motors in each channel bear a predetermined relationship with respect to each other.

3. In a system of the type described, a motor driven at a preselected speed of operation, means responsive to the operation of said motor for developing an output voltage corresponding to the speed of operation of said motor, a second motor connected for operation by said output voltage, means responsive to the operation of said second motor for developing a voltage, means for algebraically adding said last voltage to said output voltage to control the speed of operation of said second motor so that the speeds of the first and second motors bear a predetermined relationship with respect to each other, and voltage-developing means for algebraically adding a third voltage to the first two voltages to change the predetermined relationship existing between the speeds of said two motors as a function of said third voltage.

4. A two-channel system comprising a motor-generator set in each channel wherein the generator is driven by its respective motor, a voltage source for energizing the motor in one of said channels, means connecting the output of the generator in said one channel to control the speed of operation of both motors, and means connecting the output of the generator in said other channel to additionally control the speed of operation of said motor in said other channel, whereby the speeds of both motors bear a predetermined relation to each other.

5. In a system of the type described, a motor driven at a preselected speed of operation, means responsive to the operation of said motor for developing an output voltage corresponding to the speed of operation of said motor, a second motor connected for operation by said output voltage, means responsive to the operation of said second motor for developing a voltage which is algebraically added to said first output voltage to control the speed of operation of said second motor whereby the speeds of both motors bear a predetermined relation to each other, and a differential mechanism connected to said motors and having an output shaft displaceable in accordance with the differential in the speeds of said motors.

6. In a system of the type described, a motor driven at a preselected speed of operation, means responsive to the operation of said motor for developing an output voltage corresponding to the speed of operation of said motor, a second motor connected for operation by said output voltage, means responsive to the operation of said second motor for developing a voltage which is algebraically added to said first output voltage to control the speed of operation of said second motor whereby the speeds of both motors bear a predetermined relation to each other, a differential mechanism connected to said motors and having an output shaft displaceable in accordance with the differential speed of said motors, means for producing a control voltage, and means for mixing the control voltage and the outputs of both said responsive means to change the speed of operation of said second motor whereby the angular displacement of said output shaft corresponds to the integral of the control voltage with the time for which it is applied.

7. In a system of the type described, a motor driven at a preselected speed of operation, means responsive to the operation of said motor for developing an A. C. output voltage corresponding to the speed of operation of said motor, a second A. C. motor connected for operation by said output voltage, and feedback means coupled in circuit with said second motor and said first means and including voltage-developing means responsive to the operation of said second motor for developing an A. C. voltage opposite in phase to the voltage of said first means to additionally control the operation of said second motor so that the speeds of both of said motors bear a predetermined relation to each other.

8. In a system of the type described, a motor energized from a voltage supply source, means responsive to the operation of said motor for developing an output voltage corresponding to the speed of operation of said motor, means for coupling said output voltage to said motor for controlling the speed of operation of said motor, a second motor, means for coupling said output voltage to said second motor to drive said second motor, means responsive to the operation of said second motor for developing a voltage corresponding to the speed of operation thereof, and means for coupling said last-mentioned voltage to said second motor to control the speed of operation of said second motor so that the speeds of said first and second motors bear a predetermined relation to each other.

9. A two-channel system comprising a constant-speed channel and a variable-speed channel, each channel having a motor and a generator, the generator in each channel being driven by its respective motor and the motor in said constant-speed channel being operated at a constant speed so that its associated generator produces a first signal of constant magnitude, means for coupling said first signal to the motor in the variable-speed channel for driving said last-mentioned motor, means for combining said first signal with the signal produced by the generator in the variable-speed channel to produce a resultant signal which is coupled to said last-mentioned motor to control the speed of the operation thereof so that the speeds of said motors in the absence of a control signal bear a predetermined relation to each other, and means in circuit with the outputs of said generators for producing a control signal which is independent of the signals produced by said generators and which is combined with said resultant signal to produce a modified resultant signal to vary the predetermined relation between the speeds of said motors as a function of said control signal.

10. In a system of the type described, a motor driven at a preselected speed of operation, means responsive to the operation of said motor for developing an output voltage corresponding to the speed of operation of said motor, a second motor connected for operation by said output voltage, means responsive to the operation of said second motor for developing a voltage which is algebraically added to said first output voltage to control the speed of operation of said second motor whereby the speeds of both motors bear a predetermined relation to each other, a displaceable output member, and means including differential apparatus responsive to the speeds of said motors for displacing said output member as a function of the difference in the speeds of said motors.

11. In a system of the type described, a motor driven at a preselected speed of operation, means responsive to the operation of said motor for developing an output voltage corresponding to the speed of operation of said motor, a second motor connected for operation by said output voltage, means responsive to the operation of said second motor for developing a voltage which is algebraically added to said first output voltage to control the speed of operation of said second motor whereby the speeds of both motors bear a predetermined relation to each other, means for producing a control voltage, means for combining said control voltage and the output voltages from both of said responsive means to change the speed of said second motor with respect to the speed of said first motor as a function of said control voltage, a displaceable output member, and means including differential apparatus responsive to the speeds of said motors for displacing said output member in accordance with the difference in the speeds of said motors so that the total displacement of said output member for a given period of time corresponds to the integral of said control voltage for said given period of time.

12. In apparatus for indicating the distance travelled by an object, a first motor driven at a preselected speed of operation, a second motor, means responsive to the speed of said object for producing a control signal corresponding to the speed of said object and electrically coupled in circuit with said second motor for driving said second motor at a speed which deviates from the preselected speed of operation of said first motor by an amount substantially proportional to the speed of said object, a displaceable output member, means including differential apparatus responsive to the speeds of said motors for displacing said output member in accordance with the differential speed of said motors so that the displacement of said member is substantially proportional to the integral of the control signal for the time during which it is applied, and means responsive to the displacement of said member for indicating the distance travelled by said object.

13. Means for providing controlled rotation of an output member from zero to a desired maximum R. P. M., comprising a motor driven at a predetermined speed of operation, a second motor, means in circuit with said second motor and responsive to the operation of said first motor for controlling the speed of operation of said second motor thereby tending to run said motors at substantially equal speeds, means coupled in circuit with said control means and said second motor for varying the control exerted by said control means to produce unequal speeds of said motors, and differential means responsive to the speeds of both said motors for rotating said output member proportional to the difference in the speeds of said motors.

14. A control system comprising a constant-speed motor, a variable-speed motor, a signal generator operated by said constant-speed motor for developing a signal corresponding to the speed of operation of the constant-speed motor, means communicating said signal to said variable-speed motor thereby tending to maintain the speed of operation of said variable speed motor in substantial synchronism with the constant-speed motor, means for providing a control signal for varying the speed of said variable-speed motor, and a differential mechanism having a pair of input members driven respectively by said motors and having an output member displaceable in accordance with the difference between the speeds of said motors.

15. In apparatus responsive to a sensed condition; signal generating means for producing an electrical command signal having a magnitude proportional to the sensed condition, a pair of continuously running motors normally operating at speeds having a predetermined fixed relationship to each other upon said sensed condition having a zero value, said sensed condition variable from said zero value in opposite senses, means responsive to the magnitude of the command signal and the sense in which the sensed condition varies from said zero value so as to alter the relative speeds of said motors as a function of the magnitude of said command signal and the sense in which said condition varies from said zero value, and output means moved as a function of the relative speeds of said motors.

16. In apparatus responsive to a sensed condition; signal generating means for producing an electrical command signal in response to said sensed condition, a pair of continuously running motors normally operating at speeds having a predetermined fixed relationship to each other upon a null electrical command signal from said signal generating means, means responsive to the electrical command signal produced by said signal generating means to alter the relative speeds of said continuously running motors in a sense depending upon the sensed condition, and output means moved as a function of the relative speeds of said motors.

References Cited in the file of this patent

UNITED STATES PATENTS

| | | |
|---|---|---|
| 1,926,275 | FitzGerald | Sept. 12, 1933 |
| 2,102,911 | Perry | Dec. 21, 1937 |
| 2,231,133 | MacNeil | Feb. 11, 1941 |
| 2,356,051 | Hanna et al. | Aug. 15, 1944 |
| 2,411,147 | Cooley | Nov. 19, 1946 |
| 2,419,637 | Gabriel et al. | Apr. 29, 1947 |
| 2,480,065 | Wanner | Aug. 23, 1949 |
| 2,613,878 | Hailey | Oct. 14, 1952 |
| 2,678,414 | Polasek | May 11, 1954 |